June 7, 1932. H. L. M. J. BENARD ET AL  1,861,680
DEVICE FOR ACOUSTICALLY DETECTING AND TRACING AIRCRAFT
Filed July 24, 1930

H. L. M. J. Benard
A. J. Marcelin  INVENTORS

By: Marks & Clerk
Attys.

Patented June 7, 1932 1,861,680

UNITED STATES PATENT OFFICE

HENRI LUGLIEN MARIE JOSEPH BENARD AND ANDRÉ JULES MARCELIN, OF PARIS, FRANCE

DEVICE FOR ACOUSTICALLY DETECTING AND TRACING AIRCRAFT

Application filed July 24, 1930, Serial No. 470,487, and in France April 17, 1930.

As acoustic data are never as accurate as optic data, it is important to be able to pass as soon as possible from acoustic to optic means for detecting and tracing an aircraft or the like. Consequently a detecting station should comprise both acoustic and optic detecting means.

The coordinates of the aircraft being obtained acoustically or optically are transmitted either directly to the apparatus requiring them such as a gun or a searchlight or better still to an intermediary apparatus which brings to these data the required corrections which allow them to be used directly by the gun or searchlight.

Our invention has for its object a device for connecting the apparatus to be controlled, whether a gun, a searchlight or a projector either with the acoustic or with the optic detecting means as required, the latter means being mechanically interconnected through a rigid assembly of rods in which is interposed a device allowing under certain conditions the optic device to be moved independently of the acoustic device in order to take into account on one hand the so-called acoustic aberration phenomenon corresponding to the distance travelled over by the aircraft during the time required for the sound to reach the listener-in and on the other hand any small irregularities in the acoustic laying.

Our complete arrangement is double and comprises independent transmission means for the two coordinates of the air craft such as its azimuth and angle of sight. The two transmission means are similar and we will describe only one of them hereinafter.

We have shown a preferred form of execution thereof, by way of example, in the accompanying drawing.

Figure 1:
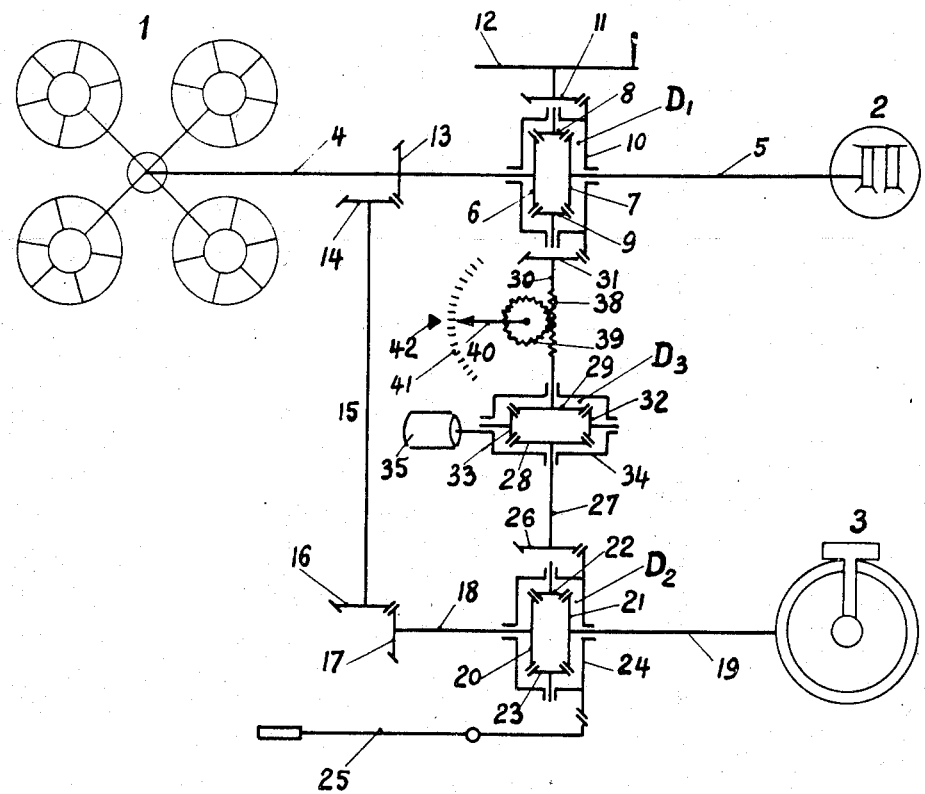
Figure 2:
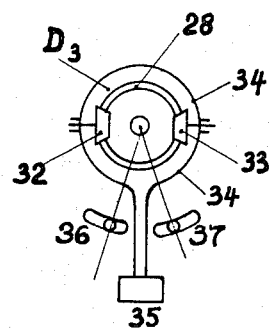

Fig. 1 is a general diagrammatic view of the transmission means and Fig. 2 is a front view of an element thereof.

The listening-in device is shown at 1, the binocular sight glass forming the optic detecting means at 2 and the corrector to which the data from the preceding devices are to be transmitted at 3.

The listening in device is connected with the optic device through a rigid connection comprising two alined shafts 4 and 5 connected through a differential gear $D_1$. The shaft 4 carries one of the sun wheels 6 and the shaft 5 the other sun wheel 7. The differential gear $D_1$ is completed by two planet wheels 8 and 9 and by their rotary casing controlled through the pinion 11 rotating integrally with the hand wheel 12.

To the shaft 4 is keyed a bevel pinion 13 controlling another pinion 14 keyed to a shaft 15 the other end of which carries a bevel pinion 16 engaging a bevel pinion 17 carried by a shaft 18 connected through the differential gear $D_2$ to the shaft 19 controlling the corrector 3.

The differential gear $D_2$ comprises a sun wheel 20 keyed to the shaft 18 and a sun wheel 21 keyed to the shaft 19, said sunwheels being connected through the planet wheels 22 and 23, the casing 24 of the latter being set in any angular position through the lever 25.

The outer toothwork of the casing 24 meshes with a pinion 26 keyed to a shaft carrying one of the sunwheels 28 of a third differential gear $D_3$. The second sunwheel 29 thereof is carried by a shaft 30 to which is keyed a bevel wheel 31 meshing with the toothwork on the casing 10 of the differential casing $D_1$.

The differential gear $D_3$ is completed by the two planet wheels 32—33 and by their casing 34 (Figs. 1 and 2) to which is directly secured a counterweight 35 adapted to move between two adjustable stops 36—37 and of which the center of gravity may be raised or lowered.

A part 38 of the shaft 30 acts as a worm and meshes with a toothed wheel 39 carrying a hand 40 moving over a stationary scale 41 provided with a mark 42.

The working is as follows:

As soon as the aircraft is detected by the listeners-in at the acoustic detecting device 1, they keep the said device directed toward the air-craft by acting on their control hand wheels. The movements are transmitted on one hand to the corrector 3 by the pinions 13 and 14, the shaft 15, the pinions 16 and 17, the shaft 18, the differential gear $D_2$ of which the casing is held in a stationary setting by the lever 25 and the shaft 19 and on the other hand to the sight-glass through the shaft 4, the sunwheels 6 and 7 of the differential gear $D_1$ and the shaft 5. This transmission is provided integrally as the counterweight 35 holds under the action of gravity, the casing 34 of $D_3$ and consequently the casing 10 of $D_1$ stationary.

The result is that the observer at the sight glass has his sightglass moved through the acoustic laying device. He has, nevertheless, a certain freedom of operation and may by using his hand wheel 12 modify the position of his sight-glass with reference to that given to it by the acoustic laying device 1. It is sufficient therefore that he overcomes the resistance afforded by the counterweight 35 when acting on the shaft 5.

From this moment onwards and for a short time, the shafts 4 and 5 rotate at different speeds and the casing 10 of the differential gear $D_1$ is driven at a speed equal to the difference between the speeds of said shafts.

This rotation is transmitted through the pinion 31 and the shaft 30 to the sun wheel 29 of the differential gear $D_3$. As the second sun wheel 28 of $D_3$ is locked by the lever 25 acting on it through the casing 24 of the differential $D_2$, the pinion 26 and the shaft 27, the casing 34 secured to the planet wheels is rotated and raises the counterweight 35.

The rotation of the casing 10 is simultaneously transmitted to the hand 40 moving over the scale 41.

In brief during this part of the operation corresponding to the hearing of the aircraft, the working is as follows: The work effected by the optic observer at 2 in order to overcome the resistances against rotation of his hand wheel when he destroys the correspondency between the two detecting devices is stored in the counterweight 35 as potential energy formed in the field of gravity.

Now if when operating as stated, the observer at 2 finds the aircraft through his sightglass, he continues acting on his handwheel 12 so as to keep his sightglass on the aircraft and henceforward the data provided thereby are transmitted to the corrector 3 without the listening in device 1 ceasing to be operative.

To this end the observer at 2, as soon as he has seen the aircraft, releases the casing 24 of the differential $D_2$ or causes it to be released through the actuation of the lever 25. The sunwheel 28 of the differential $D_3$ being no longer held stationary, the casing 34 is urged back under the action of the counterweight 35 in its normal vertical position where it remains stationary. The movement of the sun-wheel 29 is transmitted to the sun-wheel 28, to the shaft 27, the pinion 26 and the casing 24. This movement is added in the differential $D_2$ with the movement transmitted directly from the listening-in device 1 and the resulting movement is transmitted to the correcting device 3.

This second part of the operation corresponds to the seeing of the aircraft and may be summarized as follows:

It is necessary for transmitting to the corrector the data for optic laying when the aircraft is seen through the sight-glass:

(a) To compensate at the corrector for the difference in the laying of the sight-glass with reference to the listening-in device as laid during the first part of operation corresponding to the hearing of the aircraft;

(b) To ensure synchronism between the sight-glass and the corrector.

The first condition is provided by the variation in the potential energy of the counterweight 35 at the moment of the release of the casing 24 and the second by the mechanical connection between the optic apparatus and the corrector through the agency of the three differential gears.

Lastly it may happen that the observer at the station 2 loses sight of the aircraft. It is therefore necessary to return to the first modus operandi by synchronizing again the listening-in device with the optic device and disconnecting the corrector from the optic device. To this end we return through the handwheel 12, the hand 40 in front of its mark 42 so as to remove the angular shifting of the corrector with reference to the acoustic detecting device and the lever 25 is then caused to lock the casing 24 of the differential $D_2$ in the position assumed by it.

Of course the above described device may be considerably modified: thus any type of differential (with bevel or straight pinions, etc.) may be used, the hand 40 may be controlled otherwise than through a worm gear as shown; the counterweight 35 may be replaced by any other means adapted to store up energy, such as a spring, a compressible fluid, etc.

What we claim is:

1. A combined optical and acoustic detecting device comprising a listening-in device, an optic detecting device, a receiver shaft, a connection whereby the listening in device controls the optic detecting device, means for actuating the optic device independently of the listening-in device, a resistant device against which the said independent actuation is effected and adapted to store energy up thereby, means whereby the data given out by the optic device are transmitted through this resistant device to the receiver shaft, means for synchronizing when desired the receiver shaft with the listener-in device and means for returning the whole arrangement to its original position.

2. A combined optical and acoustic detecting device comprising a listening-in device, an optic detecting device, a receiver shaft, a first differential connecting the two first devices, a second differential connecting the listening-in device and the receiver shaft, a third differential connecting the two former and including sun wheels operatively connected with the planet wheel casing of the other differentials respectively, means operable at will for locking the planet wheel casing of the second differential, a resistant device adapted to store energy and connected with the planet wheel casing of the third differential and means for returning the two first devices into their original relative position.

3. A combined optical and acoustic detecting device comprising a listening-in device, an optic detecting device, a receiver shaft, a first differential connecting the two first devices, a second differential connecting the listening-in device and the receiver shaft, a third differential connecting the two former and including sunwheels operatively connected with the planet wheel casing of the other differentials respectively, means operable at will for locking the planet wheel casing of the second differential, a resistant device adapted to store energy and connected with the planet wheel casing of the third differential and a handwheel controlling the planet wheel casing of the first differential.

4. A combined optical and acoustic detecting device comprising a listening-in device, an optic detecting device, a receiver shaft, a first differential connecting the two first devices, a second differential connecting the listening-in device and the receiver shaft, a third differential connecting the two former and including sunwheels operatively connected with the planet wheel casing of the other differential respectively, means operable at will for locking the planet wheel casing of the second differential, a resistant device adapted to store energy and connected with the planet wheel casing of the third differential, a hand controlled by the planet wheel casing of the first differential, a scale cooperating therewith and provided with a mark and a handwheel controlling the planet wheel casing of the first differential and adapted to return the hand over its mark.

5. A combined optical and acoustic detecting device comprising a listening-in device, an optic detecting device, a receiver shaft, a first differential connecting the two first devices, a second differential connecting the listening-in device and the receiver shaft, a third differential connecting the two former and including sunwheels operatively connected with the planet wheel casing of the other differentials respectively, means operable at will for locking the planet wheel casing of the second differential, a counterweight secured directly to the planet wheel casing of the third differential and adapted to move on either side of the vertical whereby it forms energy storing means, adjustable stops limiting the angular movement of the counterweight and a handwheel controlling the rotation of the first differential.

In testimony whereof we have affixed our signatures.

HENRI LUGLIEN MARIE JOSEPH BENARD.
ANDRÉ JULES MARCELIN.